(12) United States Patent
Cantadori

(10) Patent No.: US 12,643,561 B2
(45) Date of Patent: Jun. 2, 2026

(54) METHOD FOR ALIGNING A VEHICLE TO AN ADAS CALIBRATION TARGET AND AN ADAS CALIBRATION SYSTEM

(71) Applicant: MAHLE International GmbH, Stuttgart (DE)

(72) Inventor: Andrea Cantadori, Parma (IT)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 145 days.

(21) Appl. No.: 18/318,101

(22) Filed: May 16, 2023

(65) Prior Publication Data

US 2023/0365148 A1 Nov. 16, 2023

(30) Foreign Application Priority Data

May 16, 2022 (EP) .................................... 22173550

(51) Int. Cl.

| | |
|---|---|
| ***G08G 1/16*** | (2006.01) |
| ***B60W 50/08*** | (2020.01) |
| ***G06F 16/535*** | (2019.01) |
| ***G06T 7/73*** | (2017.01) |
| ***G06V 10/44*** | (2022.01) |
| ***G06V 10/56*** | (2022.01) |
| ***G06V 20/62*** | (2022.01) |
| ***G08G 5/80*** | (2025.01) |
| ***G08G 7/02*** | (2006.01) |

(52) U.S. Cl.
CPC ........... *B60W 50/08* (2013.01); *G06F 16/535* (2019.01); *G06T 7/73* (2017.01); *G06V 10/44* (2022.01); *G06V 10/56* (2022.01); *G06V 20/625* (2022.01); *G06T 2207/10012* (2013.01)

(58) Field of Classification Search
CPC .... B60W 50/08; G06F 16/535; G06F 16/532; G06T 7/73; G06T 2207/10012; G06V 10/44; G06V 10/56; G06V 20/625; G01B 11/272; G01S 7/497
See application file for complete search history.

(56) References Cited

U.S. PATENT DOCUMENTS 11,417,098 B1 * 8/2022 Campbell .......... H04N 21/2743
2019/0331482 A1 * 10/2019 Lawrence ............. G01S 7/4052

(Continued)

*Primary Examiner* — Anne Marie Antonucci
*Assistant Examiner* — Jingli Wang
(74) *Attorney, Agent, or Firm* — Chrisman Gallo Tochtrop LLC

(57) ABSTRACT

A method for aligning a vehicle to an ADAS calibration target may include providing a support bearing a camera arrangement and the calibration target, positioning the vehicle and the support so that the calibration target and the camera arrangement are in front of the vehicle, and moving the vehicle until a front license plate of the vehicle is detected by the camera arrangement. The method may also include acquiring one or more images and in response to detecting the front license plate in the images, identifying the corresponding alphanumeric code. The method may further include querying a first database to retrieve a model of the vehicle associated with said alphanumeric code, querying a second database to retrieve a predetermined position that is associated with the model of the vehicle, and providing commands to a driver for driving the vehicle so as the vehicle reaches said predetermined position.

16 Claims, 4 Drawing Sheets

(56) References Cited

U.S. PATENT DOCUMENTS

2020/0239009 A1* 7/2020 Corghi ............... G01B 11/2755
2021/0347338 A1* 11/2021 Strege ................... G01S 7/4026
2021/0387637 A1* 12/2021 Rogers ............... G01B 11/2755

* cited by examiner

METHOD FOR ALIGNING A VEHICLE TO AN ADAS CALIBRATION TARGET AND AN ADAS CALIBRATION SYSTEM

FIELD

The present disclosure relates to a method for aligning a vehicle to an ADAS calibration target and to an ADAS calibration system.

BACKGROUND

As it is known, ADAS is the acronym for Advanced Driver Assistance Systems, that are electronic driving assistance systems for vehicles that support the driver for the purpose of increasing safety and/or driving comfort.

At technological level, ADAS systems are based on a plurality of sensors (cameras, radar, Lidar, etc.) able to detect different information that are used as input data for a smart algorithm that oversees the degree of autonomy of the vehicle.

These sensors need to be calibrated directly by the manufacturer before the vehicle is placed on the market.

SUMMARY

A method for aligning a vehicle to an ADAS calibration target is provided. The vehicle may have a front license plate integrally mounted thereon and the front license plate may have a substantially rectangular surface bearing an alphanumeric code univocally associated with said vehicle. The method may include providing a support bearing a camera arrangement and the calibration target and positioning the vehicle in a service area. The method may further include positioning the support in proximity of the service area so that the calibration target and the camera arrangement are in front of the vehicle and moving the vehicle with respect to the support until the front license plate of the vehicle is detected by the camera arrangement. The method may also include acquiring one or more images by way of the camera arrangement and in response to detecting the front license plate in the images, identifying the corresponding alphanumeric code. The method may further include querying a first database to retrieve a model of the vehicle univocally associated to said alphanumeric code and querying a second database to retrieve a predetermined position that is associated with the model of the vehicle to be calibrated. The method may also include providing commands to a driver for driving the vehicle so as the vehicle reaches said predetermined position.

BRIEF DESCRIPTION OF THE DRAWINGS

Additional features and advantages of the present disclosure will become more apparent from the non-limiting, description some embodiments of a method for aligning a vehicle to an ADAS calibration target and of an ADAS calibration system, as illustrated in the appended drawings, in which.

DESCRIPTION OF EMBODIMENTS

Figure 1:
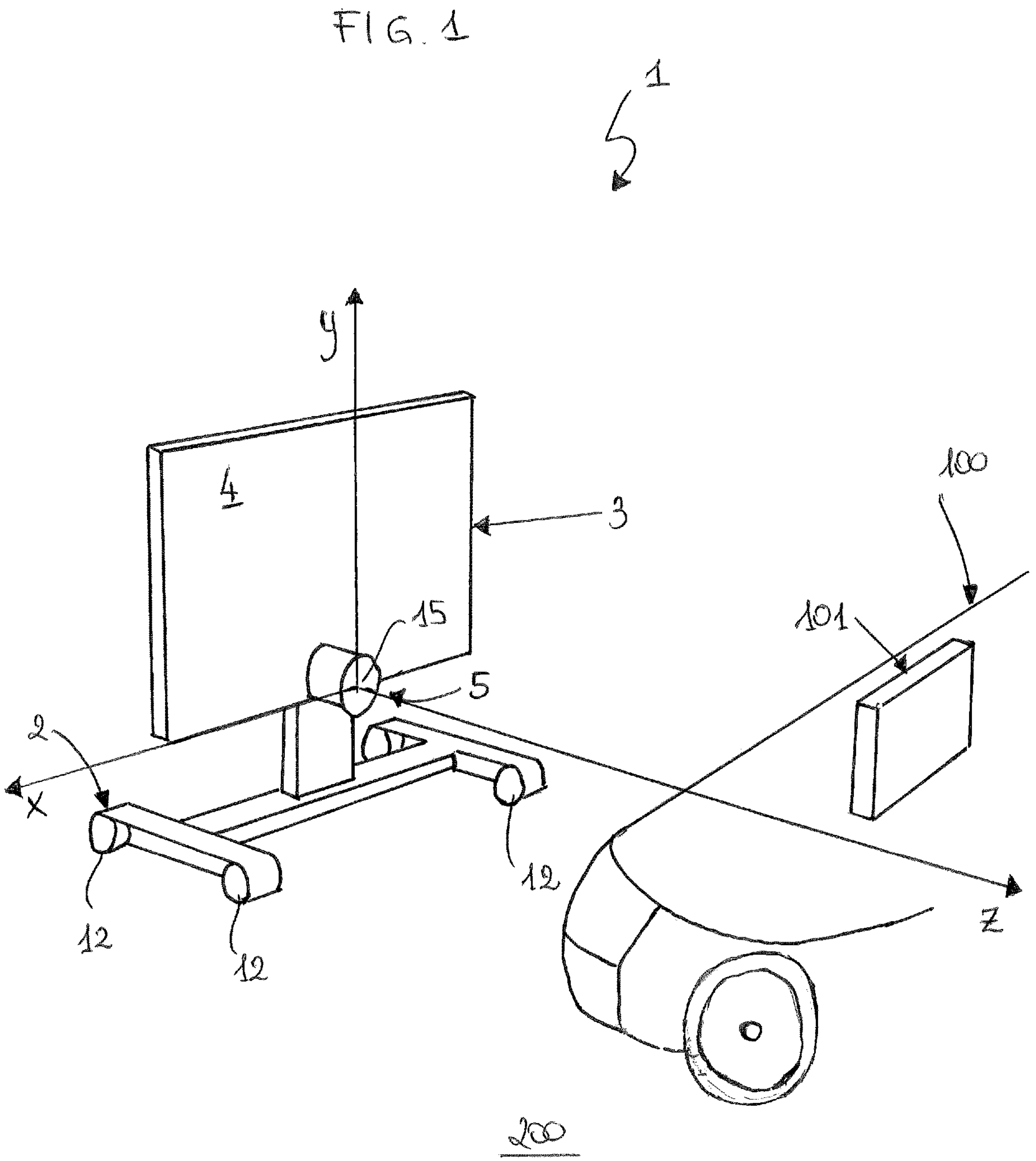
FIG. 1 schematically illustrates an embodiment of an ADAS calibration system.
Figure 2:
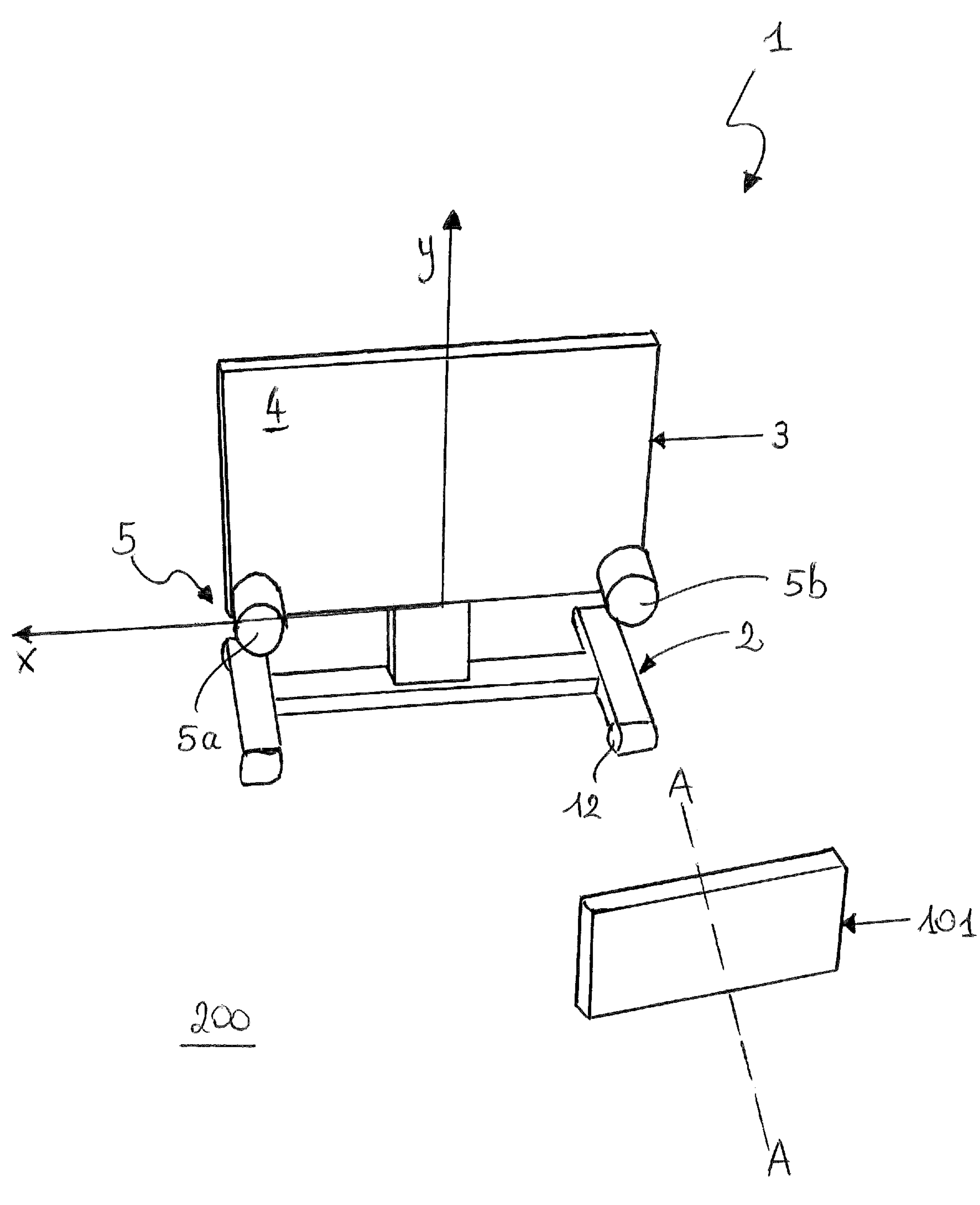
FIG. 2 schematically illustrates another embodiment of an ADAS calibration system.

Among the several calibration methods available nowadays, one method of calibration of an optical sensor, like the front camera, or of a radar mounted on board of a vehicle is disclosed in EP3588001 and US 2019/0392610. In some embodiments, calibrating an optical sensor mounted on board of a vehicle may comprise the steps of: positioning the vehicle in a test station consisting of a horizontal or inclined support zone for supporting the vehicle, arranging a projection surface for images or videos in front of said test station, identifying the type of said optical sensor, selecting in a memory an image or video associated with the type of said optical sensor, adapting or deforming the image or video selected in said memory to the size of the projection surface, projecting the image or video selected or the adapted or deformed version thereof onto said projection surface, and adjusting the position of the optical axis of said optical sensor starting from said projected image or video.

This calibration method can also be used in the event of a vehicle placed on an inclined plane. In fact, it is sufficient to suitably deform or adapt the image or the video to be projected onto the screen instead of performing the spatial adjustment of the screen with respect to the vehicle.

Most of calibration apparatuses have a support in the form of a movable trolley, i.e. by means of wheels, in order to be positioned in front of the vehicle located in a test station.

Two laser meters are slidably mounted on a horizontal bar of the support for detecting the distances of two front or rear wheels of the vehicle from the support. In particular, the laser meters are moved along the horizontal bar until they point at two clamps with optical targets arranged on the front or rear wheels of the vehicle.

Indeed, the vast majority of ADAS calibration equipment's available on the market use systems for detecting the position of the vehicle with respect to the target, which have in common the use of clamps (to be applied on the rim or tyre) combined with optical targets or mirrors or laser pointers.

As an alternative to clamps, certain solutions use targets resting on the ground, next to the wheels. This solution has the advantage of avoiding attaching anything to the wheels, but it is less accurate than clamps.

In both solutions, once the vehicle has been positioned, it cannot be moved anymore. Consequently, any adjustment of the relative position of vehicle-target must be carried out by moving the support. This requires time and care by the human operators.

In addition, clamps are expensive and bulky items. Their application always requires a few minutes and a certain degree of care to avoid scratching the rims, which are often expensive.

There is felt the need of solutions that avoid the use of clamps or optical targets lying next to the wheels.

In this context, the technical task underlying the present disclosure is to propose a method for aligning a vehicle to an ADAS calibration target and an ADAS calibration system, which may help to overcome the drawbacks as described above.

In particular, an object of the present disclosure is to provide a method for aligning a vehicle to an ADAS calibration target and an ADAS calibration system, which are more accurate and reliable than prior art solutions.

Another object of the present disclosure is to make available an ADAS calibration system which is more compact, easier, and quicker to use than the known solutions.

The stated technical task and specified objects are substantially achieved by a method for aligning a vehicle to an ADAS calibration target, the vehicle having a front license plate integrally mounted thereon, the front license plate having a substantially rectangular surface bearing an alphanumeric code univocally associated with the vehicle, the method comprising the steps of:

providing a support bearing a camera arrangement and the calibration target;

positioning the vehicle in a service area;

positioning the support in proximity of the service area so that the calibration target and the camera arrangement are in front of the vehicle;

moving the vehicle with respect to the support until the front license plate of the vehicle is detected by the camera arrangement;

acquiring images by way of the camera arrangement and, in response to detecting the front license plate therein, identifying the corresponding alphanumeric code;

querying a first database to retrieve a model of the vehicle univocally associated to the alphanumeric code;

querying a second database to retrieve a predetermined position that is associated with the model of the vehicle to be calibrated;

providing commands to a driver for driving the vehicle so as it reaches said predetermined position.

According to an aspect of the disclosure, the camera arrangement is mounted below the calibration target.

According to one embodiment of the disclosure, the camera arrangement comprises a single camera.

According to another embodiment of the disclosure, the camera arrangement comprises a pair of stereo cameras.

According to as aspect of the disclosure, detecting of the front license plate is carried out by colour analysis or contour analysis.

The stated technical task and specified objects are substantially achieved by an ADAS calibration system for calibrating at least one ADAS sensor of a vehicle having a front license plate integrally mounted thereon, the front license plate having a substantially rectangular surface bearing an alphanumeric code univocally associated with the vehicle, said ADAS calibration system comprising:

a movable support;

a calibrating device comprising a target mounted on the support;

a camera arrangement mounted on the support and configured to acquire images of the front license plate of the vehicle;

a control unit configured to:

receive images acquired from the camera arrangement and recognize therein a front license plate;

in response to recognizing a front license plate in the acquired image, identify the corresponding alphanumeric code in the acquired image;

query a first database to retrieve a model of the vehicle univocally associated to said alphanumeric code;

query a second database to retrieve a predetermined position that is associated with the model of the vehicle to be calibrated;

provide commands to a driver for driving the vehicle so as it reaches said predetermined position.

According to one embodiment of the disclosure, the target consists of or includes a monitor configured to project images or videos.

According to an aspect of the disclosure, the camera arrangement is mounted below the monitor.

According to one embodiment of the disclosure, the camera arrangement comprises a single camera.

In particular, the camera is positioned so that its centre is located in the middle of a bottom side of the monitor.

According to another embodiment of the disclosure, the camera arrangement comprises a pair of stereo cameras.

In particular, the stereo cameras are symmetrically arranged with respect to vertical symmetric axis of the monitor.

With reference to the figures, number 1 indicates an ADAS calibration system for a calibrating one or more ADAS sensors mounted on board of a vehicle 100, in particular a motor vehicle such as an automobile, a bus, a lorry, a road tractor, a tractor trailer, an articulated lorry, a farm machinery, a working vehicle, a self-propelled vehicle, etc.

For example, ADAS sensors may comprise CMOS or CCD type sensors of a television camera, and/or a front radar installed on the vehicle 100.

The vehicle 100 has a front license plate 101 (also referred shortly as "plate" here) that is integrally mounted thereon.

The front license plate 101 is mounted on a central front part of the vehicle 100, preferably on the bumper.

As it is known, the front license plate 101 has a substantially rectangular surface bearing an alphanumeric code 102.

The dimensions of the rectangular surface are established by specific regulations, usually depending on the country.

For example, in Italy the rectangular surface of the front license plate 101 is 360 mm×110 mm.

In particular, the front license plate 101 bears an alphanumeric code 102 univocally associated with said vehicle 100.

Indeed, alphanumeric codes of vehicles are archived in dedicated national databases, together with other vehicles' data.

Assuming that the vehicle 100 has a longitudinal axis A-A of symmetry, the front license plate 101 is theoretically mounted perpendicular to said longitudinal axis A-A.

The ADAS calibration system 1 comprises a support 2 that is preferably movable, i.e. by way of wheels 12, in order to be positioned in front of the vehicle 100 located in a service area 200.

The ADAS calibration system 1 comprises a calibrating device 3 mounted on the support 2.

The calibrating device 3 comprises a target 4 that is preferably a monitor configured to project images or videos.

In particular, the monitor 4 has a displaying surface that is rectangular. The monitor 4 is mounted on the support 2 so that a first pair of sides of its rectangular displaying surface are parallel to the ground where the support 2 lies, whereas a second pair of sides of the rectangular displaying surface are orthogonal to said ground.

The sides of the first pair are preferably longer than the sides of the second pair.

The ADAS calibration system 1 further comprises a camera arrangement 5 integrally mounted on the support 2.

For example, the camera arrangement 5 is mounted on a bottom part of the monitor 4 or below the monitor 4.

According to one embodiment of the disclosure, the camera arrangement 5 comprises a single camera 15, for example a monochrome camera.

The centre of the camera 15 is assumed as the origin of a spatial reference system (x, y, z).

In particular, the displaying surface of the monitor 4 lies on the plane defined by the coordinates x, y of said spatial reference system (x, y, z), or on a plane that is parallel to the plane x, y.

The other axis, which is axis z, coincides with the optical axis of the camera 15.

In particular, the camera 15 is positioned so that the origin is located in the middle of bottom side of the displaying surface of the monitor 4, the bottom side lying along the axis X.

According to another embodiment of the disclosure, the camera arrangement 5 comprises a pair of stereo cameras 5*a*, 5*b* for establishing a binocular vision.

In this embodiment, the origin of the spatial reference system (x, y, z) coincides with the middle of the bottom side of the displaying surface of the monitor 4.

The two cameras 5*a*, 5*b* are positioned along the bottom side of the displaying surface of the monitor 4, symmetrically with respect to the origin.

In both the embodiments, the camera arrangement 5 is configured to acquire images of the central front part of the vehicle 100 located in the service area 200.

In particular, the camera arrangement 5 is configured to acquire images of the front license plate 101.

The ADAS calibration system 1 further comprises a control unit 6 that is configured to receive the images from the camera arrangement 5 and to recognize therein the front license plate 101.

In particular, in response to recognizing the front license plate 101 in the image acquired by the camera arrangement 5, the control unit 6 is configured to identify the corresponding alphanumeric code 102 impressed on the front license plate 101.

In addition, the control unit 6 is further configured to control the projection of images or video on the monitor 4, for example according to known methods, like the ones disclosed in documents EP3588001 and US 2019/0392610, which are incorporated herein by reference in their entireties.

Preferably, the control unit 6 mounted on the support 2, for example behind the monitor 4.

The method for aligning a vehicle to an ADAS calibration target, according to the present disclosure, is described hereafter.

The vehicle 100 is initially positioned in the service area 200.

The ADAS calibration system 1 is placed in proximity of the service area 200, in particular moving the support 2 so that the target (for example the monitor 4) and the camera arrangement 5 are located in front of the vehicle 100.

For the sake of simplicity, the method further is described referring to the embodiment with a single camera 15.

The camera 15 starts acquiring images of the central front part of the vehicle 100 located in the service area 200.

The control unit 6 processes the images acquired by the camera 15 and drives their displaying on the monitor 4 by highlighting an area of interest with a rectangular or a square on the monitor 4 (for example a green square).

In particular, the area of interest is the area within which the camera should appear when the vehicle 100 approaches the support 2.

This area of interest is appropriate as it avoids having to process very large images (which would therefore require much more computing power) and at the same time does not consider optical artefacts far away from the area of interest itself, that could interfere with the algorithm while having no physical significance.

Figure 3:
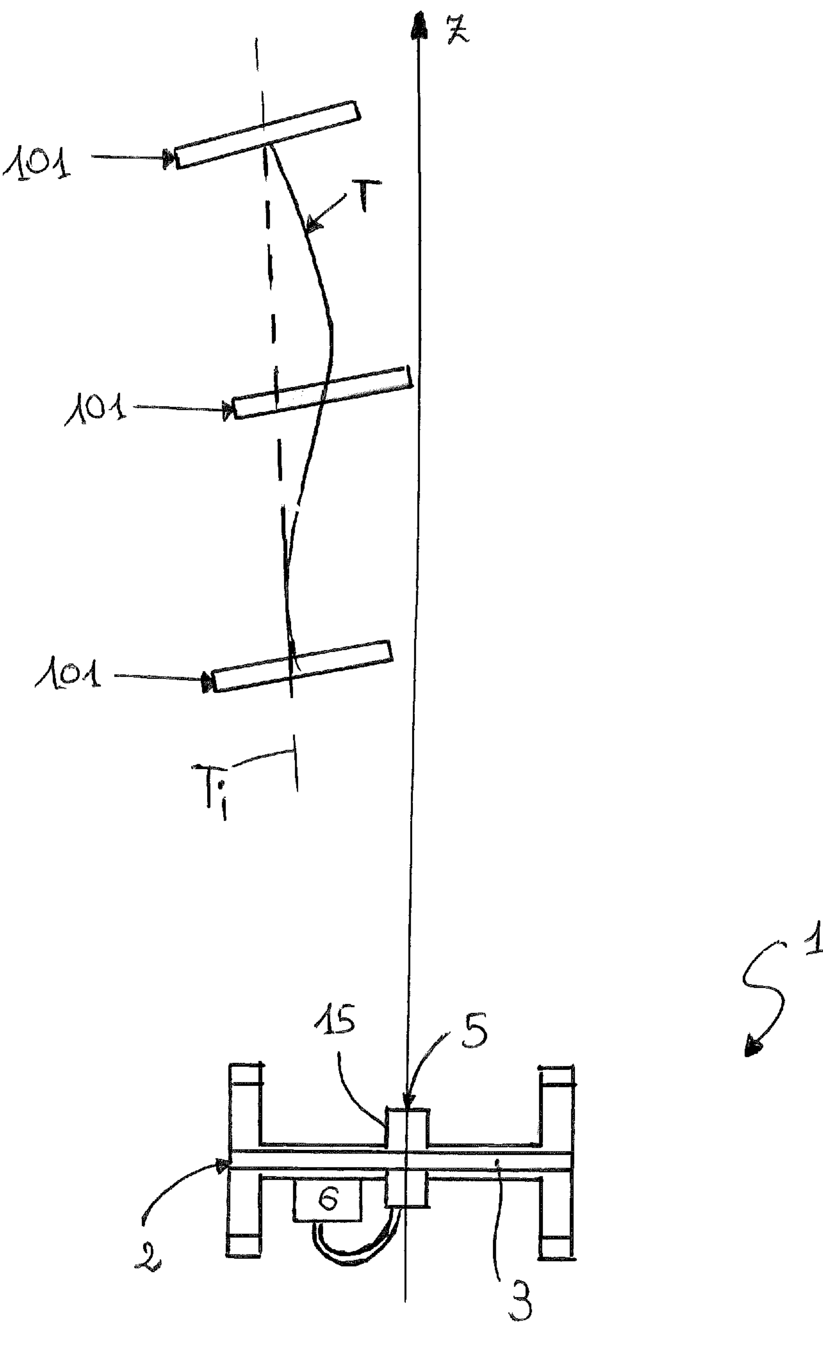
FIG. 3 illustrates different positions assumed by the front license plate corresponding to different position assumed by the vehicle during a method for aligning a vehicle to an ADAS calibration target in plant view.
Figure 4:
FIG. 4 illustrates the detection of the front license plate, according to a method for aligning a vehicle to an ADAS calibration target.

A human operator, sitting in the driver's seat of the vehicle 100, is invited by messages displayed on the monitor 4 to slowly approach the support 2, taking care to keep the steering wheel steady so that, during the approach to the support 2, the vehicle 100 moves in a straight line (whatever the direction). The approaching movement are illustrated in FIG. 3, with reference to the movement of the front license plate 101 for the sake of simplicity.

As soon as the front license plate 101 enters the field of view of the camera 15, the front license plate 101 is detected by the control unit 6 and the corresponding image is decoded, thus allowing to identify the alphanumeric code 102.

The detection of the front license plate 101 may be done according to known algorithms, for example based on colour analysis (e.g., the Italian license plates consist of a white rectangle flanked by two smaller blue rectangles, each with a specific shape ratio) or contour analysis (algorithms of the so-called 'Canny' family).

Then, the method comprises a step of querying a first database to retrieve a model of the vehicle 100 associated to said alphanumeric code 102.

In fact, as already stated above, the alphanumeric code 102 is univocally associated to a vehicle 100, thus the model vehicle may be retrieved from a first database, which may be a car national database.

Once the vehicle's model is known, a second database is queried to retrieve a predetermined position that is associated with said model for performing a proper calibration of the ADAS sensors mounted on board of the vehicle 100.

The predetermined position is defined in a relative way, as the distance between the centre of the front license plate 101 and the centre of the camera arrangement 5.

In the embodiment with a single camera 15, the centre is the centre of the camera 15 (that is the origin of the spatial reference system (x, y, z)).

Preferably, the second database is an internal database that may be archived on a memory configured to communicate with the control unit 6. The memory may be mounted on the support 2 or may be remotely located from the support 2.

The method then proceeds with a step of providing commands to the human operator to drive the vehicle 100 so as to reach the predetermined position.

Once the vehicle 100 arrives in the predetermined position, the calibration of the ADAS sensors mounted on board of the vehicle 100 can start. This may be carried out according to known techniques.

In particular, once the vehicle 100 has reached the predetermined position, it remains stationary.

At the beginning of this disclosure, it was assumed that the front license plate 101 was substantially perpendicular to the longitudinal axis A-A of the vehicle 100. Nevertheless, there may be deviations from orthogonality, for example caused by impacts undergone by the front license plate 101.

This is the reason why the human operator sitting in the driver's seat of the vehicle 100 is requested to slowly approach the support 2, taking care to keep the steering wheel steady.

Accordingly, the centre of the front license plate 101 will follow a trajectory T that, properly interpolated (interpolation indicated by Ti in FIG. 3), gives the direction of the longitudinal axis A-A of the vehicle 100.

The information about this trajectory T and the apparent dimensions of the front license plate 101 are used to determine the four basic parameters to be set in the ADAS calibration system for performing the calibration of the vehicle 100.

This occurs according to known computation methods, as described hereafter for the sake of completeness.

Knowing the parameters of the camera 15 (and in particular the pixel size in microns and its focal length) and obtaining from the image which was processed as described above the apparent dimensions of the front license plate 101 (height×width, possibly corrected by the slight rotation of the plate itself), it is possible to establish the distance of the front license plate 101 from the camera 15 by way of the following formula:

$$D=f\times N\times p/D0 \quad (1)$$

where: D is the distance of the front license plate 101 from the camera focus (origin), N is the number of pixels (in height or width) of the acquired image of the front license plate 101, P is the micron size of camera pixels (usually in the order of 1-3 microns), and DO is the actual size (height or width) of the front license plate 101, depending on the country regulations.

The formula (1) may be valid if the front license plate 101 is perpendicular to the axis z. Otherwise there is an uncertainty given by the inclination of the front license plate 101 with respect to the axis z, which can be removed in a mathematically rigorous manner by using the embodiment with the pair of stereo cameras 5*a*, 5*b*.

However, for small values of the angle of inclination, it is possible to disregard this phenomenon and assume that the front license plate 101 is in any case perpendicular to the ADAS calibration system.

For example, if the monitor 4 and the vehicle 100 (and thus the front license plate 101) are mutually tilted by 5°, the apparent width of the plate, as seen from the camera, is reduced by a factor cos (5°), i.e. by 0.4%. According to the formula (1) this uncertainty is reflected in the distance assessment. Now, at a typical distance of 1 m from the structure, this results in an uncertainty in the distance calculation of 4 mm, which is acceptable to the vast majority of car manufacturers.

As an alternative, as it is stated binocular vision can be used.

In the embodiment with a pair of stereo cameras 5*a*, 5*b*, the image of the front license plate 101 is used as an optical target, without any assumption on the dimensions. This embodiment allows to obtain a more precise determination, even in case of vertical deviations in the position of the front license plate 101.

The other steps of the method are substantially the same described for the single camera.

The characteristics of the method for aligning a vehicle to an ADAS calibration target and of the ADAS calibration system, according to the present disclosure, emerge clearly from the above description, as do the advantages.

In particular, the alignment of the vehicle with respect to ADAS calibration system is carried out by way of a camera arrangement integrally mounted on the ADAS support, the camera being configured to identify the alphanumeric code on the license plate.

The solution is thus more compact and easier to use by human operators. Indeed, the camera arrangement may comprise a single camera or a pair of stereo cameras mounted on the ADAS support.

The alignment is performed easily and quickly since the human operator simply drives the vehicle following the position commands coming from the ADAS system once the vehicle's model has been identified starting from the detected alphanumeric code of the front license plate.

The solution is even more convenient in quick service centres, e.g., windscreen replacement centres.

Thus, clamps or optical targets lying next to the wheels are no more necessary. The support is not moved anymore, while the vehicle is moved according to accurate position commands computed by the ADAS system.

In addition, the accuracy is higher as well as reliability.

In accordance with common practice, the various features illustrated in the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method for aligning a vehicle to a calibration target of an Advanced Driver Assistance System, the vehicle having a front license plate integrally mounted thereon, said front license plate having a substantially rectangular surface bearing an alphanumeric code univocally associated with said vehicle, the method comprising the steps of:

- providing a support bearing a camera arrangement and the calibration target;
- positioning the vehicle in a service area;
- positioning the support in proximity of the service area so that the calibration target and the camera arrangement are in front of the vehicle;
- moving the vehicle with respect to the support until the front license plate of the vehicle is detected by the camera arrangement;
- acquiring one or more images of the front license plate by way of the camera arrangement;
- in response to detecting, by a control unit, the front license plate in the images, identifying, by the control unit, the alphanumeric code on the front license plate;

- querying, by the control unit, a first database to retrieve a model of the vehicle univocally associated to said alphanumeric code;
- querying, by the control unit, a second database to retrieve a predetermined position, relative to the camera arrangement of the support, that is associated with the model of the vehicle to be calibrated;
- determining, by the control unit, in a continuous manner, a current position of the vehicle relative to the support;
- providing, by the control unit, continuous commands to a driver to drive the vehicle towards the camera arrangement of the support until the current position of the vehicle reaches said predetermined position;
- providing, by the control unit, a command to the driver to stop the vehicle so that it remains stationary once the vehicle has reached said predetermined position; and
- calibrating an optical sensor on board the vehicle when the vehicle has reached the predetermined position.

2. The method according to claim 1, wherein the camera arrangement comprises a single camera.

3. The method according to claim 2, wherein the detecting of the front license plate is carried out by colour analysis or contour analysis.

4. The method according to claim 1, wherein the camera arrangement comprises a pair of stereo cameras.

5. The method according to claim 4, wherein the detecting of the front license plate is carried out by colour analysis or contour analysis.

6. The method according to claim 1, wherein the camera arrangement is mounted below the calibration target.

7. The method according to claim 6, wherein the camera arrangement comprises a single camera.

8. The method according to claim 6, wherein the camera arrangement comprises a pair of stereo cameras.

9. The method according to claim 6, wherein the detecting of the front license plate is carried out by colour analysis or contour analysis.

10. An Advanced Driver Assistance Systems (ADAS) calibration system for calibrating at least one ADAS sensor of a vehicle having a front license plate integrally mounted thereon, said front license plate having a substantially rectangular surface bearing an alphanumeric code univocally associated with said vehicle, said ADAS calibration system comprising:

- a movable support;
- a calibrating device comprising a target mounted on the support;
- a camera arrangement mounted on the support and configured to acquire images of the front license plate of the vehicle; and
- a control unit configured to:
  - receive one or more images acquired from the camera arrangement;
  - recognize in the images the front license plate;
  - in response to recognizing the front license plate in the acquired image, identify the alphanumeric code of the front license plate in the acquired image;
  - query a first database to retrieve a model of the vehicle univocally associated to said alphanumeric code;
  - query a second database to retrieve a predetermined position, relative to the camera arrangement of the support, that is associated with the model of the vehicle to be calibrated;
  - determine, by the control unit, in a continuous manner, a current position of the vehicle relative to the support;
  - provide, by the control unit, continuous commands to a driver to drive the vehicle towards the camera arrangement of the support until the current position of the vehicle reaches said predetermined position; and
  - provide, by the control unit, a command to the driver to stop the vehicle so that it remains stationary once the vehicle has reached said predetermined position; and
  - calibrate an optical sensor on board the vehicle when the vehicle has reached the predetermined position.

11. The ADAS calibration system according to claim 10, wherein the target consists of a monitor configured to project images or videos.

12. The ADAS calibration system according to claim 11, wherein the camera arrangement is mounted below the monitor.

13. The ADAS calibration system according to claim 12, wherein the camera arrangement comprises a single camera.

14. The ADAS calibration system according to claim 13, wherein the camera is positioned so that its centre is located in the middle of a bottom side of the monitor.

15. The ADAS calibration system according to claim 12, wherein the camera arrangement comprises a pair of stereo camera.

16. The ADAS calibration system according to claim 15, wherein said stereo cameras are symmetrically arranged with respect to vertical symmetric axis of the monitor.

* * * * *